US008445584B2

(12) United States Patent
Uchida

(10) Patent No.: US 8,445,584 B2
(45) Date of Patent: May 21, 2013

(54) AQUEOUS POLYURETHANE RESIN

(75) Inventor: Takashi Uchida, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 101 days.

(21) Appl. No.: 12/311,024

(22) PCT Filed: Sep. 10, 2007

(86) PCT No.: PCT/JP2007/067614
§ 371 (c)(1),
(2), (4) Date: Mar. 17, 2009

(87) PCT Pub. No.: WO2008/035585
PCT Pub. Date: Mar. 27, 2008

(65) Prior Publication Data
US 2009/0326147 A1  Dec. 31, 2009

(30) Foreign Application Priority Data
Sep. 20, 2006  (JP) .................. 2006-254924

(51) Int. Cl.
*C08G 18/08* (2006.01)
*C08K 3/20* (2006.01)

(52) U.S. Cl.
USPC .......... 524/591; 524/590; 524/588; 524/837; 524/838; 524/839; 524/871; 524/874; 528/59; 528/61; 528/76; 528/78; 528/85

(58) Field of Classification Search
USPC ................. 524/590, 591, 837, 838, 839, 871, 524/874, 588; 528/28, 59, 61, 76, 78, 85
See application file for complete search history.

(56) References Cited

U.S. PATENT DOCUMENTS

| | | | | |
|---|---|---|---|---|
| 3,905,929 A | | 9/1975 | Noll | |
| 4,237,264 A | * | 12/1980 | Noll et al. | 528/67 |
| 5,041,494 A | * | 8/1991 | Franke et al. | 524/588 |
| 5,043,381 A | | 8/1991 | Coogan et al. | |
| 5,760,123 A | * | 6/1998 | Vogt-Birnbrich et al. | 524/500 |
| 2006/0183845 A1 | * | 8/2006 | Harada et al. | 524/588 |

FOREIGN PATENT DOCUMENTS

| | | |
|---|---|---|
| CN | 1788030 | 6/2006 |
| JP | 50-2794 | 1/1975 |
| JP | 1-104612 A | 4/1989 |
| JP | 11-60936 A | 3/1999 |
| JP | 11-60939 A | 3/1999 |
| JP | 11-106733 A | 4/1999 |
| JP | 11-247072 A | 9/1999 |
| JP | 2000-282372 A | 10/2000 |
| JP | 2000282372 A * | 10/2000 |
| JP | 2003-48946 A | 2/2003 |
| JP | 2006-96852 A | 4/2006 |
| JP | 2006-335951 | 12/2006 |

OTHER PUBLICATIONS

Office Action in CN Appln No. 200780034579.1 dated Mar. 23, 2011.
Office Action Japanese Application No. 2008-535322 dated Oct. 16, 2012.

* cited by examiner

*Primary Examiner* — Michael L Leonard
(74) *Attorney, Agent, or Firm* — Foley & Lardner LLP

(57) ABSTRACT

An aqueous polyurethane resin having a Si atom content of 0.05 to 1.5% by weight in a polyurethane resin is produced by at least reacting an isocyanate group-terminated prepolymer which contains 1 to 15% by weight of a polyoxyethylene group in a side chain branched from the main chain and has two or more isocyanate groups at an end of the main chain, with a chain extender which contains at least a compound having two or more active hydrogen groups reactive with the isocyanate group and an alkoxysilyl group.

7 Claims, No Drawings

AQUEOUS POLYURETHANE RESIN

This application is a U.S. National Phase application under 35 U.S.C. §371 of PCT Application No. PCT/JP2007/067614, filed Sep. 10, 2007, which claims priority under 35 U.S.C. §119 (a)-(d) of Japanese Patent Application No. 2006-254924, filed Sep. 20, 2006.

TECHNICAL FIELD

The present invention relates to aqueous polyurethane resins, and more particularly, to aqueous polyurethane resins suitably used for production of artificial leather or the like.

BACKGROUND ART

Heretofore, artificial leather made of nonwoven cloth which is impregnated with a polyurethane resin has been known for excellent feel. Such artificial leather has conventionally been produced, for example, by a wet process of impregnating nonwoven cloth made of ultrafine fibers with a polyurethane resin dissolved in an organic solvent such as N,N-dimethyl formamide (DMF), and removing the organic solvent by extraction in water.

In recent years, from the viewpoint of environmental burden, it has been desired to reduce the use of organic solvents, and even in the production of artificial leather described above, an aqueous polyurethane resin is considered to be used instead of the polyurethane resin dissolved in DMF.

Hence, as a production method of artificial leather by using an aqueous polyurethane resin, for example, the following Patent Document 1 proposes a method for producing artificial leather including the steps of impregnating base cloth with a polyurethane dispersion, the polyurethane dispersion being obtained by emulsifying and dispersing a urethane prepolymer having an isocyanate group at its end using a nonionic surfactant having an HLB of 7 to 16 and then chain-extending the urethane prepolymer using a polyamine compound having two or more amino groups and/or imino groups; thereafter, immersing the base cloth in warm water of 40 to 100° C.; and then drying it.
Patent Document 1: Japanese Unexamined Patent Publication No. 2000-282372

DISCLOSURE OF THE INVENTION

Problems to be Solved

In the production method of artificial leather described in the above Patent Document 1, although artificial leather can be produced using an aqueous polyurethane resin, this production process is still troublesome because the base cloth needs to be immersed in warm water of 40 to 100° C. after impregnated with the polyurethane dispersion.

In addition to the production steps described in the above Patent Document 1, as a method for producing artificial leather using an aqueous polyurethane resin, there has been known a dry process capable of producing artificial leather by impregnating nonwoven cloth with an aqueous polyurethane resin, and then drying the cloth, while not requiring the above-mentioned immersion treatment in warm water. According to this dry process, artificial leather can be obtained by easy operation. For this reason, an aqueous polyurethane resin which can be used in the dry process is desired to be developed.

The nonwoven cloth used for the production of artificial leather needs to be produced with ultra-fine fibers in its production step, for example, by spinning two different components into a cloth form, and subjecting the cloth to alkali treatment to thereby remove one of the components by dissolution. In the dry process, when such ultra-fining is performed after impregnation of the nonwoven cloth with an aqueous polyurethane resin, the artificial leather produced can have better feel than when performed before the impregnation. Therefore, the aqueous polyurethane resin used in the dry process needs to be resistant to alkali.

Further, since the artificial leather made of nonwoven cloth impregnated with a polyurethane resin has low durability while giving excellent feel, the durability is desired to be improved.

It is an object of the present invention to provide an aqueous polyurethane resin excellent in durability and alkali resistance, and capable of assuring excellent feel.

Means for Solving the Problem

To achieve the above object, the aqueous polyurethane resin of the present invention has a Si atom content of 0.05 to 1.5% by weight in a polyurethane resin obtained by at least reacting an isocyanate group-terminated prepolymer which contains 1 to 15% by weight of a polyoxyethylene group in a side chain branched from the main chain and has two or more isocyanate groups at an end of the main chain, with a chain extender which contains at least a compound having two or more active hydrogen groups reactive with the isocyanate group and an alkoxysilyl group.

In the aqueous polyurethane resin of the present invention, it is preferable that the isocyanate group-terminated prepolymer is obtained by at least reacting a polyisocyanate, a macropolyol, and a compound represented by the following general formula (1), and the compound having two or more active hydrogen groups and an alkoxysilyl group contained in the chain extender is a compound represented by the following general formula (2).

General formula (1):

[Chem. 1]

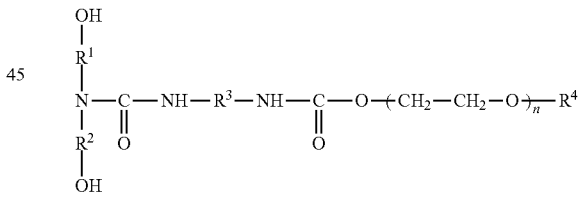

(where R1 and R2 are the same or different from each other, and each represents an alkylene group of 1 to 4 carbon atoms; R3 represents an aliphatic, alicyclic, or aralkyl hydrocarbon group of 6 to 13 carbon atoms; R4 represents an alkyl group of 1 to 4 carbon atoms; and n represents an integer of 8 to 50.)

General formula (2):

[Chem. 2]

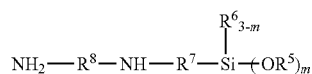

(where R5 and R6 are the same or different from each other, and each represents an alkyl group of 1 to 4 carbon atoms; R7 and R8 are the same or different from each other, and each represents an alkylene group of 1 to 4 carbon atoms; and m represents an integer of 1 to 3.)

In the aqueous polyurethane resin of the present invention, it is preferable that the macropolyol is a polycarbonatediol.

In the aqueous polyurethane resin of the present invention, it is preferable that the polycarbonatediol is an amorphous polycarbonatediol.

In the aqueous polyurethane resin of the present invention, it is preferable that the polyisocyanate is an aliphatic polyisocyanate and/or a alicyclic polyisocyanate.

In the aqueous polyurethane resin of the present invention, it is preferable that the polyisocyanate is at least one kind selected from the group consisting of 4,4'-, 2,4'- or 2,2'-dicyclohexylmethane diisocyanate or mixtures thereof, 1,3- or 1,4-bis(isocyanatomethyl)cyclohexane or mixtures thereof, 3-isocyanatomethyl-3,5,5-trimethylcyclohexyl isocyanate, and 2,5- or 2,6-bis(isocyanatomethyl)norbornane or mixtures thereof.

It is preferable that the aqueous polyurethane resin of the present invention has a thermal solidification temperature of 40 to 90° C.

Further, it is preferable that the aqueous polyurethane resin of the present invention is used for production of artificial leather.

EFFECT OF THE INVENTION

The aqueous polyurethane resin of the present invention is excellent in durability and alkali resistance, and can assure excellent feel. Therefore, for example, it can be effectively used as a raw material for artificial leather or the like. In particular, it can be used in the dry process which is one of the production processes of artificial leather, so that artificial leather can be obtained by easy operation.

EMBODIMENT OF THE INVENTION

To obtain the aqueous polyurethane resin of the present invention, first, an isocyanate group-terminated prepolymer is obtained by reacting a polyisocyanate, a macropolyol, and a diol having a polyoxyethylene group in a side chain thereof (hereinafter referred to as polyoxyethylene side chain-containing diol).

In the present invention, examples of the polyisocyanate include aliphatic polyisocyanate, alicyclic polyisocyanate, aralkyl polyisocyanate, and aromatic polyisocyanate.

Examples of the aliphatic polyisocyanate include aliphatic diisocyanates such as hexamethylene diisocyanate (HDI), trimethylene diisocyanate, tetramethylene diisocyanate, pentamethylene diisocyanate, 1,2-, 2,3- or 1,3-butylene diisocyanate, and 2,4,4- or 2,2,4-trimethyl hexamethylene diisocyanate.

Examples of the alicyclic polyisocyanate include alicyclic diisocyanates such as 3-isocyanatomethyl-3,5,5-trimethylcyclohexyl isocyanate (isophorone diisocyanate, IPDI), 4,4'-, 2,4'- or 2,2'-dicyclohexylmethane diisocyanate or mixtures thereof ($H_{12}$MDI), 1,3- or 1,4-bis(isocyanatomethyl)cyclohexane or mixtures thereof ($H_6$XDI), 2,5- or 2,6-bis(isocyanatomethyl)norbornane or mixtures thereof (NBDI), 1,3-cyclopentene diisocyanate, 1,4-cyclohexane diisocyanate, 1,3-cyclohexane diisocyanate, methyl-2,4-cyclohexane diisocyanate, and methyl-2,6-cyclohexane diisocyanate.

Examples of the aralkyl polyisocyanate include aralkyl diisocyanates such as 1,3- or 1,4-xylylene diisocyanate or mixtures thereof (XDI), 1,3- or 1,4-tetramethyl xylylene diisocyanate or mixtures thereof (TMXDI), and ω,ω'-diisocyanate-1,4-diethylbenzene.

Examples of the aromatic polyisocyanate include aromatic diisocyanates such as 4,4'-, 2,4'- or 2,2'-diphenylmethane diisocyanate or mixtures thereof (MDI), 2,4- or 2,6-tolylene diisocyanate or mixtures thereof (TDI), 4,4'-toluidine diisocyanate (TODI), 1,5-naphthalene diisocyanate (NDI), m-, or p-phenylene diisocyanate or mixtures thereof, 4,4'-diphenyl diisocyanate, and 4,4'-diphenyletherdiisocyanate.

Also, the polyisocyanate include multimers (e.g., dimers, trimers, etc.) of the above-mentioned polyisocyanates; and biuret-, allophanate-, oxadiazinetrione-, and polyol-modified polyisocyanates produced by reaction of the above-mentioned polyisocyanates or multimers thereof with water, alcohol or the low-molecular-weight polyol described below, carbon dioxide, and the low-molecular-weight polyol described below, respectively.

The low-molecular-weight polyol used in the above-mentioned polyol-modified polyisocyanate has, for example, two or more hydroxyl groups in the molecule and a molecular weight of 60 to 400, and examples thereof include low-molecular-weight diol such as ethylene glycol, propanediol, 1,4-butylene glycol, 1,3-butylene glycol, 1,2-butylene glycol, 1,5-pentanediol, 3-methyl-1,5-pentanediol, 1,6-hexandiol, neopentyl glycol, alkane (of 7 to 22 carbon atoms) diol, diethylene glycol, triethylene glycol, dipropylene glycol, cyclohexane dimethanol, alkane-1,2-diol (of 17 to 20 carbon atoms), hydrogenated bisphenol-A, 1,4-dihydroxy-2-butene, 2,6-dimethyl-1-octene-3,8-diol, bishydroxyethoxy benzene, xylene glycol and bishydroxyethylene terephthalate; low-molecular-weight triol such as glycerin, 2-methyl-2-hydroxymethyl-1,3-propanediol, 2,4-dihydroxy-3-hydroxymethylpentane, 1,2,6-hexanetriol, trimethylolpropane, 2,2-bis(hydroxymethyl)-3-butanol and other aliphatic triols (of 8 to 24 carbon atoms); and low-molecular-weight polyol having four or more hydroxyl groups such as tetramethylolmethane, D-sorbitol, xylitol, D-mannitol and D-mannite.

The above-mentioned polyisocyanates may be used alone or in combination of two or more kinds. Preferable is at least one polyisocyanate selected from the group consisting of aliphatic polyisocyanates and alicyclic polyisocyanates. When the polyisocyanate is such preferable one, the yellowing of the aqueous polyurethane resin to be described later can be reduced. More specifically, the polyisocyanate is selected from 4,4'-, 2,4'- or 2,2'-dicyclohexylmethane diisocyanate or mixtures thereof ($H_{12}$MDI), 1,3- or 1,4-bis(isocyanatomethyl)cyclohexane or mixtures thereof ($H_6$XDI), and 3-isocyanatomethyl-3,5,5-trimethylcyclohexyl isocyanate (isophorone diisocyanate, IPDI).

In the present invention, examples of the macropolyol include polyether polyol, polyester polyol, polycarbonate polyol, acrylic polyol, epoxy polyol, natural oil polyol, silicone polyol, fluorine polyol and polyolefin polyol.

Examples of the polyether polyol include polyalkylene oxides such as polyethylene glycol, polypropylene glycol and polyethylene polypropylene glycol (random or block copolymer) which are obtained by addition reaction of alkylene oxide such as ethyleneoxide and/or propylene oxide, for example, using the above-mentioned low-molecular-weight polyol as an initiator. Examples thereof also include polytetramethylene ether glycol obtained by ring-opening polymerization of tetrahydrofuran or other manner.

Examples of the polyester polyol include those obtained by reaction of one kind or two or more kinds of the above-mentioned low-molecular-weight polyols with carboxylic acid such as oxalic acid, malonic acid, succinic acid, methyl succinic acid, glutaric acid, adipic acid, 1,1-dimethyl-1,3-dicarboxypropane, 3-methyl-3-ethyl glutaric acid, azelaic acid, sebacic acid, other aliphatic dicarboxylic acids (of 11 to 13 carbon atoms), hydrogenated dimer acid, maleic acid, fumaric acid, itaconic acid, orthophthalic acid, isophthalic acid, terephthalic acid, toluene dicarboxylic acid, dimer acid and HET acid, and acid anhydride derived from these carboxylic acids, such as oxalic anhydride, succinic anhydride, maleic anhydride, phthalic anhydride, 2-alkyl (of 12 to 18 carbon atoms) succinic anhydride, tetrahydrophthalic anhydride and trimellitic anhydride, and also acid halide derived from these carboxylic acids such as oxalic dichloride, adipic dichloride and sebacic dichloride. Further, examples thereof include lactone polyester polyols such as polycaprolactone polyol and polyvalerolactone polyol, which are obtained by ring-opening polymerization of lactones such as ε-caprolactone and γ-valerolactone, for example using the above-mentioned low-molecular-weight polyol as an initiator.

Examples of the polycarbonate polyol include those obtained by reacting the above low-molecular-weight polyol with at least one kind selected from the group consisting of phosgene, dialkyl carbonate, diaryl carbonate, and alkylene carbonate.

Examples of the acrylic polyol include copolymers obtained by copolymerizing a polymerizable monomer having one or more hydroxyl groups in its molecule with another monomer copolymerizable with the polymerizable monomer. Examples of the polymerizable monomer having a hydroxyl group include 2-hydroxyethyl(meth)acrylate, hydroxypropyl (meth)acrylate, hydroxybutyl(meth)acrylate, 2,2-dihydroxymethylbutyl (meth)acrylate, polyhydroxyalkyl maleate, and polyhydroxyalkyl fumarate. Moreover, examples of such another monomer copolymerizable with these polymerizable monomers include (meth) acrylic acid, alkyl(meth) acrylate (of 1 to 12 carbon atoms), maleic acid, alkyl maleate, fumaric acid, alkyl fumarate, itaconic acid, alkyl itaconate, styrene, α-methyl styrene, vinyl acetate, (meth)acrylonitrile, 3-(2-isocyanate-2-propyl)-α-methylstyrene, trimethylolpropane tri(meth)acrylate, and pentaerythritol tetra(meth)acrylate. The acrylic polyol can be obtained by copolymerizing these monomers in the presence of a suitable solvent and a suitable polymerization initiator.

Examples of the epoxy polyol include epoxy polyols obtained by reaction of the above-mentioned low-molecular-weight polyol with a polyfunctional halohydrin such as epichlorohydrin and β-methyl epichlorohydrin.

Examples of the natural oil polyol include hydroxyl group-containing natural oil such as castor oil and coconut oil.

Examples of the silicone polyol include copolymers in which vinyl group-containing silicone compounds such as γ-methacryloxypropyl trimethoxy silane are used as another copolymerizable monomer in the copolymerization of the above acrylic polyols; and terminal alcohol-modified polydimethylsiloxane.

Examples of the fluorine polyol include copolymers in which vinyl group-containing fluorine compounds such as tetrafluoroethylene and chlorotrifluoroethylene are used as another copolymerizable monomer in the copolymerization of the above acrylic polyols.

Examples of the polyolefin polyol include polybutadiene polyol and partially saponified ethylene-vinylacetate copolymer.

These macropolyols have a number average molecular weight of, for example, 300 to 10000, or preferably 500 to 5000, and have a hydroxyl equivalent of, for example, 100 to 5000, or preferably 160 to 3000.

These macropolyols may be used alone or in combination of two or more kinds. Among these macropolyols, polyether polyol, polyester polyol, and polycarbonate polyol are preferable; polycarbonate polyol and particularly, polycarbonate diol are more preferable; or amorphous polycarbonate diol made of a copolymer of 1,5-pentanediol and 1,6-hexandiol, amorphous polycarbonate diol made of a copolymer of 1,4-butanediol and 1,6-hexandiol, and amorphous polycarbonate diol made of 3-methyl-1,5-pentanediol are even more preferable. When the macropolyol is an amorphous polycarbonate diol, artificial leather which gives excellent feel can be produced, for example, using the aqueous polyurethane resin to be described later.

In the present invention, the polyoxyethylene side chain-containing diol can be produced in the following process. For example, first, urethanation reaction is conducted by mixing diisocyanate (the above-mentioned diisocyanate) and a one-end-capped polyoxyethylene glycol (alkoxy ethylene glycol of which the terminal is capped with an alkyl group of 1 to 4 carbon atoms) at such a ratio that the equivalent ratio (NCO/OH) of the isocyanate group (NCO) of the diisocyanate to the hydroxyl group (OH) of the one-end-capped polyoxyethylene glycol is, for example, 2 to 50, or preferably 5 to 20, that is, the amount of NCO exceeds that of OH, and thereafter, if necessary, unreacted diisocyanate is removed from the mixture by distillation or the like, to obtain a polyoxyethylene group-containing monoisocyanate. Subsequently, ureation reaction is conducted by mixing the polyoxyethylene group-containing monoisocyanate thus obtained and dialkanolamine (dialkanolamine of 1 to 4 carbon atoms) at such a ratio that the equivalent ratio ($NCO/NH_2$) of the isocyanate group (NCO) of polyoxyethylene group-containing monoisocyanate to the amino group ($NH_2$) of the dialkanolamine is, for example, 0.9 to 1.1, or preferably 0.95 to 1.05, that is, the amount of NCO is nearly equal to that of $NH_2$.

In the production of the polyoxyethylene side chain-containing diol, examples of the diisocyanate include the aliphatic polyisocyanates and the alicyclic polyisocyanates, which are mentioned above, and preferred examples thereof include 4,4'-, 2,4'- or 2,2'-dicyclohexylmethane diisocyanate or mixtures thereof ($H_{12}MDI$), 1,3- or 1,4-bis(isocyanatomethyl)cyclohexane or mixtures thereof ($H_6XDI$), and 3-isocyanatomethyl-3,5,5-trimethylcyclohexyl isocyanate (isophorone diisocyanate, IPDI).

Examples of the one-end-capped polyoxyethylene glycol include methoxypolyethylene glycol and ethoxypolyethylene glycol, and the number average molecular weight thereof is 300 to 3000, or preferably 400 to 2000.

The dialkanolamine has 1 to 4 carbon atoms, and examples thereof include symmetrical dialkanolamine such as dimethanolamine, diethanolamine, and dipropanolamine; and asymmetrical dialkanolamine such as methanol ethanolamine and ethanol propanolamine. Among them, symmetrical dialkanolamine is preferable, or diethanolamine is more preferable.

The polyoxyethylene side chain-containing diol thus produced has a urethane bond and a urea bond, and is represented, for example, by the following general formula (1).

General formula (1):

[Chem. 3]

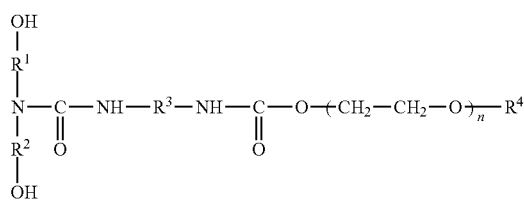

(where R1 and R2 are the same or different from each other, and each represents an alkylene group of 1 to 4 carbon atoms; R3 represents an aliphatic, alicyclic, or aralkyl hydrocarbon group of 6 to 13 carbon atoms; R4 represents an alkyl group of 1 to 4 carbon atoms; and n represents an integer of 8 to 50.)

In the above general formula (1), each of R1 and R2 is a dialkanolamine residue, and examples of the residue thereof include an alkylene group of 1 to 4 carbon atoms, such as a methylene group, an ethylene group, a propylene group and a butylene group. R3 is a diisocyanate residue, and examples thereof include an aliphatic, alicyclic, or aralkyl hydrocarbon group of 6 to 13 carbon atoms. Further, R4 is a one-end-capped polyoxyethylene glycol residue, and examples of the residue thereof include an alkyl group 1 to 4 carbon atoms, such as a methyl group, an ethyl group, a propyl group, and a butyl group.

The isocyanate group-terminated prepolymer is obtained, for example, by preparing (mixing) a polyisocyanate, a macropolyol, and a polyoxyethylene side chain-containing diol at such a ratio that the equivalent ratio (NCO/OH) of the isocyanate group (NCO) of the polyisocyanate to the hydroxyl group (OH) (when the low-molecular-weight polyol to be described later is mixed, the hydroxyl group thereof is included.) of the macropolyol and the polyoxyethylene side chain-containing diol is, for example, 1.1 to 2.5, or preferably 1.2 to 2.0, and allowing the mixture to react by a known polymerization method such as bulk polymerization or solution polymerization.

In bulk polymerization, for example, while the polyisocyanate is stirred under nitrogen flow, the macropolyol and the polyoxyethylene side chain-containing diol are added thereto, and the mixture is allowed to react at a reaction temperature of 80 to 160° C. for about 2 to 8 hours.

In solution polymerization, the polyisocyanate, the macropolyol, and the polyoxyethylene side chain-containing diol are added to an organic solvent, and the mixture is allowed to react at a reaction temperature of 50 to 100° C. for about 2 to 15 hours. The organic solvent is a low-boiling solvent inert to isocyanate groups, having a high affinity to water, and easy to eliminate, and examples thereof include ketones such as acetone and methyl ethyl ketone; ethers such as tetrahydrofuran; nitriles such as acetonitrile; and esters such as ethyl acetate and butyl acetate.

In the above-mentioned polymerization reaction, the low-molecular-weight polyol mentioned above can also be appropriately mixed depending on the purpose and application. The low-molecular-weight polyol is, for example, a low-molecular-weight polyol having two or more hydroxyl groups in the molecule and a molecular weight of 60 to 400, and examples thereof include the low molecular polyols listed above. Preferred examples thereof include neopentyl glycol, 1,4-butylene glycol, 1,6-hexandiol, and 3-methyl-1,5-pentanediol.

Further, in the above polymerization reaction, if necessary, a known urethanizing catalyst such as amine catalyst, tin catalyst, and lead catalyst may be added, and free (unreacted) polyisocyanate from the isocyanate group-terminated prepolymer obtained may be removed by a known removal means such as distillation or extraction.

In this reaction, the polyoxyethylene side chain-containing diol is mixed, for example, so that the polyoxyethylene group content is 1 to 15% by weight, or preferably, 3 to 10% by weight of the total weight of the isocyanate group-terminated prepolymer. When the polyoxyethylene group content is within this range, it is possible to produce artificial leather which gives excellent feel using this aqueous polyurethane resin as described later.

The isocyanate group-terminated prepolymer thus obtained is a self-emulsification type polyurethane prepolymer which has two or more free isocyanate groups at the end of the molecule and has a polyoxyethylene group in a side chain thereof, and the isocyanate group content is, for example, 0.3 to 10% by weight, or preferably 0.5 to 5% by weight. The isocyanate group has an average functionality of, for example, 1.5 to 3.0, or preferably 1.9 to 2.2 and a number average molecular weight of, for example, 1000 to 30000, or preferably 1500 to 15000.

To obtain the aqueous polyurethane resin of the present invention, the isocyanate group-terminated prepolymer thus obtained is allowed to react with a chain extender.

In the present invention, the chain extender contains at least a compound having at least two or more active hydrogen groups and an alkoxysilyl group in one molecule.

In the alkoxysilyl group, examples of the alkoxy group to be bonded with a Si atom include alkoxy groups of 1 to 4 carbon atoms, such as a methoxy group, an ethoxy group, a propoxy group, a butoxy group, an isopropoxy group and an isobutoxy group. Among them, a methoxy group and an ethoxy group are preferable. The number of the above alkoxy group bonded to Si atoms is usually 1 to 3, or preferably 1 to 2.

The active hydrogen group reacts with an isocyanate group, and examples thereof include amino groups and hydroxyl groups. Among them, amino groups are preferable. The equivalent of the active hydrogen group contained in the chain extender is preferably 250 to 800 mg KOH/g, or more preferably 350 to 600 mg KOH/g. When the equivalent of the active hydrogen group is within this range, it is possible to obtain an aqueous polyurethane resin having excellent durability.

The compound having at least two or more active hydrogen groups and an alkoxysilyl group in one molecule in such chain extender is represented, for example, by the following general formula (2).

General formula (2):

[Chem. 4]

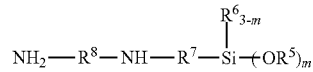

(where R5 and R6 are the same or different from each other, and each represents an alkyl group of 1 to 4 carbon atoms; R7 and R8 are the same or different from each other, and each represents an alkylene group of 1 to 4 carbon atoms; and m represents an integer of 1 to 3.)

In the above-mentioned general formula (2), examples of each of R5 and R6 include an alkyl group of 1 to 4 carbon atoms, such as a methyl group, an ethyl group, a propyl group and a butyl group. Further, examples of each of R7 and R8 include an alkylene group of 1 to 4 carbon atoms, such as a methylene group, an ethylene group, a propylene group and a butylene group.

More specifically, examples of the compound include N-β (aminoethyl)-γ-aminopropylmethyl dimethoxysilane, N-β (aminoethyl)-γ-aminopropyl trimethoxysilane, γ-(2-aminoethyl)aminopropyl triethoxysilane, γ-(2-aminoethyl) aminopropyl dimethoxysilane, γ-(2-aminoethyl) aminopropyl diethoxysilane, γ-aminopropyl trimethoxysilane, γ-aminopropyl triethoxysilane, γ-aminopropyl dimethoxysilane, γ-aminopropyl diethoxysilane and N,N'-bis[(a-(trimethoxysilyl)propyl)]ethylenediamine.

These may be used alone or in combination of two or more kinds. Among them, N-β(aminoethyl)-γ-aminopropylmethyl dimethoxysilane is preferable.

In addition to these chain extenders, a polyamine compound not containing a Si atom may be appropriately used together. Examples of such polyamine compound include diamines such as ethylenediamine, 1,3-propanediamine, 1,4-butanediamine, 1,6-hexamethylenediamine, 1,4-cyclohexanediamine, 3 aminomethyl-3,5,5-trimethlycyclohexyl amine (isophorone diamine), 4,4'-dicyclohexylmethanediamine, 2,5(2,6)-bis(aminomethyl) bicyclo[2.2.1]heptane and 1,3-bis(aminomethyl)cyclohexane; polyamines such as diethylenetriamine, triethylenetetramine and tetraethylenepentamine; and amino alcohols such as N-(2-aminoethyl) ethanolamine. These polyamine compounds may be used alone or in combination of two or more kinds.

To allow the isocyanate group-terminated prepolymer to react with the chain extender in water, for example, first, water is added to the isocyanate group-terminated prepolymer to prepare an aqueous dispersion thereof, and the chain extender is added thereto to chain-extend the isocyanate group-terminated prepolymer.

The aqueous dispersion of the isocyanate group-terminated prepolymer is prepared by gradually adding water to the isocyanate group-terminated prepolymer under stirring. The water is added at a ratio of preferably 65 to 1000 parts by weight per 100 parts by weight of the isocyanate group-terminated prepolymer.

Then, the chain extender is added to the thus prepared aqueous dispersion of the isocyanate group-terminated prepolymer under stirring at such a ratio that the equivalent ratio (NCO/NH, NCO/OH, etc.) of the isocyanate group (NCO) of the isocyanate group-terminated prepolymer to the active hydrogen group (NH, OH, etc.) of the chain extender is, for example, 0.2 to 1.1, or preferably 0.3 to 1.0. The chain extender is added preferably at a temperature of 40° C. or less, and after completion of the addition, the mixture is further stirred to complete the reaction at room temperature, for example.

When the isocyanate group-terminated prepolymer is obtained by solution polymerization, after completion of the reaction of the isocyanate group-terminated prepolymer, the organic solvent is removed, for example, by heating the organic solvent at an appropriate temperature under a reduced pressure.

The aqueous polyurethane resin thus obtained is prepared so as to have a solid content of, for example, 10 to 60% by weight, or preferably 20 to 50% by weight. As for the aqueous polyurethane resin (solid content), the charged ratio $((NH)_2CO/NHCOO)$ of the urea group $((NH)_2CO)$ to the urethane group (NHCOO) is, for example, 0.05 to 1.2, or preferably 0.1 to 0.8. The aqueous polyurethane resin has a number average molecular weight of, for example, 3000 to 1000000, or preferably 5000 to 100000; a polyoxyethylene group content of, for example, 1 to 15% by weight, or preferably 3 to 10% by weight; and a Si atom content of, for example, 0.05 to 1.5% by weight, or preferably 0.075 to 1.0% by weight.

The thus obtained aqueous polyurethane resin of the present invention has a thermal solidification temperature of 40 to 90° C., preferably 45 to 85° C., or more preferably 45 to 80° C., and is excellent in thermal gelation property.

The thermal solidification temperature can be adjusted by adding a nonionic surfactant having a cloud point or an inorganic salt such as sodium sulfate and calcium chloride, as an agent for accelerating thermal gelation.

The thus obtained aqueous polyurethane resin of the present invention is excellent in durability and alkali resistance, and can assure excellent feel. Therefore, it can be suitably used, for example, as a raw material for producing artificial leather by a dry process, and as a result, artificial leather having excellent durability can be obtained.

In other words, since such artificial leather can be produced by the dry process that does not employ any organic solvent as mentioned above, the artificial leather can reduce environmental impact as compared with those produced by a wet process.

Further, since the aqueous polyurethane resin of the present invention is excellent in thermal gelation property as mentioned above, it can effectively suppress the migration of the aqueous polyurethane resin impregnating a nonwoven cloth (phenomenon in which the aqueous polyurethane resin is localized on the surface of the nonwoven cloth) which is caused by movement of water during drying in the production of artificial leather. As a result, the aqueous polyurethane resin is uniformly distributed over the surface of the nonwoven cloth, thereby imparting excellent feel to the artificial leather produced.

The aqueous polyurethane resin of the present invention can be used not only for the above-mentioned artificial leather but also in various applications such as vehicles, electronic equipment, building materials, coating materials, and adhesives.

EXAMPLES

While in the following, the present invention is described with reference to Synthesis Example, Examples, and Comparative Examples, the present invention is not limited to any of them.

Synthesis Example 1

A four-neck flask equipped with an agitator, a thermometer, a reflux tube, and a nitrogen introducing tube was charged with 1000 g of methoxypolyethylene glycol (manufactured by Toho Chemical Industry Co., Ltd.) having a number average molecular weight of 1000 and 1682 g of 1,6-hexamethylene diisocyanate (manufactured by Mitsui Chemicals Polyurethanes, Inc.), and the mixture was allowed to react at 90° C. for 9 hours under a nitrogen atmosphere. The resulting reaction solution was subjected to thin-film distillation to remove unreacted 1,6-hexamethylene diisocyanate, so that a polyoxyethylene group-containing monoisocyanate (a) was obtained. Next, a four-neck flask equipped with an agitator, a thermometer, a reflux tube, and a nitrogen introducing tube was charged with 82.5 g of diethanolamine and 917.5 g of the above-mentioned monoisocyanate (a) was gradually added dropwise thereto with air-cooling under a nitrogen atmosphere so that the reaction temperature did not exceed 70° C. After completion of the dropwise addition, the mixture was stirred at 70° C. for about 1 hour under a nitrogen atmosphere, and it was then confirmed that the isocyanate group had disappeared, so that a polyoxyethylene side chain-containing diol (b) was obtained.

Example 1

A four-neck flask equipped with an agitator, a thermometer, a reflux tube, and a nitrogen introducing tube was charged with 31.4 g of the polyoxyethylene side chain-containing diol (b) synthesized in Synthesis Example 1, 246.6 g of amorphous polycarbonate diol (T-5652, manufactured by Asahi Chemical Chemicals, Corp.) having a number average molecular weight of 2000, 6.4 g of neopentyl glycol, and 226.3 g of acetone. Subsequently, 55.0 g of 1,3-(bisisocyanatomethyl)cyclohexane (manufactured by Mitsui Chemicals Polyurethanes, Inc.) and 0.07 g of stannous octoate were added thereto to allow the mixture to react at 55° C. for 6 hours, so that an isocyanate group-terminated prepolymer was obtained. The isocyanate group-terminated prepolymer thus obtained had a polyoxyethylene group content of 7.0% by weight. Next, the reaction solution was cooled to 30° C., and 650 g of ion exchange water was gradually added thereto to prepare an aqueous dispersion of the isocyanate group-terminated prepolymer. Then, 10.6 g of N-β(aminoethyl)-γ-aminopropylmethyl dimethoxysilane (KBM602, manufactured by Shin-Etsu Chemical Co., Ltd., Si atom content: 13.6% by weight) was added thereto to cause chain extension, and further, acetone was distilled off, to thereby obtain an aqueous polyurethane resin (c) having a solid content of 35% by weight. In the solid content of the aqueous polyurethane resin (c), the polyoxyethylene group content was 6.8% by weight and the Si atom content was 0.41% by weight.

Example 2

In a four-neck flask equipped with an agitator, a thermometer, a reflux tube, and a nitrogen introducing tube, 35.5 g of the polyoxyethylene side chain-containing diol (b) synthesized in Synthesis Example 1, 232.5 g of polycarbonate diol (T-5652, manufactured by Asahi Chemical Chemicals, Corp.) having a number average molecular weight of 2000, 4.8 g of neopentyl glycol, and 226.9 g of acetone were mixed. Subsequently, 67.5 g of 4,4-dicyclohexylmethane diisocyanate (manufactured by Degussa Corporation) and 0.07 g of stannous octoate were added thereto, and the mixture was allowed to react at 55° C. for 10 hours, so that an isocyanate group-terminated prepolymer was obtained. The isocyanate group-terminated prepolymer thus obtained had a polyoxyethylene group content of 7.7% by weight. Next, the reaction solution was cooled to 30° C., and 650 g of ion exchange water was gradually added thereto to prepare an aqueous dispersion of the isocyanate group-terminated prepolymer. Then, 9.6 g of N-β(aminoethyl)-γ-aminopropylmethyl dimethoxysilane (KBM602, manufactured by Shin-Etsu Chemical Co., Ltd., Si atom content: 13.6% by weight) was added thereto to cause chain extension, and further, acetone was distilled off, to thereby obtain an aqueous polyurethane resin (d) having a solid content of 35% by weight. In the solid content of the aqueous polyurethane resin (d), the polyoxyethylene group content was 7.7% by weight and the Si atom content was 0.37% by weight.

Example 3

In a four-neck flask equipped with an agitator, a thermometer, a reflux tube, and a nitrogen introducing tube, 36.1 g of the polyoxyethylene side chain-containing diol (b) synthesized in Synthesis Example 1, 236.2 g of polycarbonate diol (T-5652, manufactured by Asahi Chemical Chemicals, Corp.) having a number average molecular weight of 2000, 4.9 g of neopentyl glycol, and 230.5 g of acetone were mixed. Subsequently, 68.6 g of 4,4-dicyclohexylmethane diisocyanate (manufactured by Degussa Corporation) and 0.07 g of stannous octoate were added thereto, and the mixture was allowed to react at 55° C. for 10 hours, so that an isocyanate group-terminated prepolymer was obtained. The isocyanate group-terminated prepolymer thus obtained had a polyoxyethylene group content of 7.9% by weight. Next, the reaction solution was cooled to 30° C., and 650 g of ion exchange water was gradually added thereto to prepare an aqueous dispersion of the isocyanate group-terminated prepolymer. Then, 4.2 g of N-β(aminoethyl)-γ-aminopropylmethyl dimethoxysilane (KBM602, manufactured by Shin-Etsu Chemical Co., Ltd., Si atom content: 13.6% by weight) was added thereto to cause chain extension, and further, acetone was distilled off, to thereby obtain an aqueous polyurethane resin (e) having a solid content of 35% by weight. In the solid content of the aqueous polyurethane resin (e), the polyoxyethylene group content was 7.8% by weight and the Si atom content was 0.16% by weight.

Example 4

In a four-neck flask equipped with an agitator, a thermometer, a reflux tube, and a nitrogen introducing tube, 34.6 g of the polyoxyethylene side chain-containing diol (b) synthesized in Synthesis Example 1, 236.3 g of polycarbonate diol (T-5652, manufactured by Asahi Chemical Chemicals, Corp.) having a number average molecular weight of 2000, 6.2 g of neopentyl glycol, and 225.5 g of acetone were mixed. Subsequently, 61.3 g of isophorone diisocyanate (manufactured by Degussa Corporation) and 0.07 g of stannous octoate were added thereto, and the mixture was allowed to react at 55° C. for 8 hours, so that an isocyanate group-terminated prepolymer was obtained. The isocyanate group-terminated prepolymer thus obtained had a polyoxyethylene group content of 7.8% by weight. Next, the reaction solution was cooled to 30° C., and 650 g of ion exchange water was gradually added thereto to prepare an aqueous dispersion of the isocyanate group-terminated prepolymer. Then, 9.6 g of N-β(aminoethyl)-γ-aminopropylmethyl dimethoxysilane (KBM602, manufactured by Shin-Etsu Chemical Co., Ltd., Si atom content: 13.6% by weight) was added thereto to cause chain extension, and further, acetone was distilled off, to thereby obtain an aqueous polyurethane resin (f) having a solid content of 35% by weight. In the solid content of the aqueous polyurethane resin (f), the polyoxyethylene group content was 7.5% by weight and the Si atom content was 0.37% by weight.

Comparative Example 1

In a four-neck flask equipped with an agitator, a thermometer, a reflux tube, and a nitrogen introducing tube, 36.0 g of the polyoxyethylene side chain-containing diol (b) synthesized in Synthesis Example 1, 235.7 g of polycarbonate diol (T-5652, manufactured by Asahi Chemical Chemicals, Corp.) having a number average molecular weight of 2000, 4.9 g of neopentyl glycol, and 225.5 g of acetone were mixed. Subsequently, 68.5 g of 4,4-dicyclohexylmethane diisocyanate (manufactured by Degussa Corporation) and 0.07 g of stannous octoate were added thereto, and the mixture was allowed to react at 55° C. for 10 hours, so that an isocyanate group-terminated prepolymer was obtained. The isocyanate group-terminated prepolymer thus obtained had a polyoxyethylene group content of 7.9% by weight. Next, the reaction solution was cooled to 30° C., and 650 g of ion exchange water was gradually added thereto to prepare an aqueous dispersion of the isocyanate group-terminated prepolymer. Then, 4.9 g of 2-aminoethyl aminoethanol was added thereto to cause chain extension, and further, acetone was distilled off, to thereby obtain an aqueous polyurethane resin (g) having a solid content of 35% by weight. In the solid content of the aqueous polyurethane resin (g), the polyoxyethylene group content was 7.8% by weight and the Si atom content was 0% by weight.

Comparative Example 2

In a four-neck flask equipped with an agitator, a thermometer, a reflux tube, and a nitrogen introducing tube, 8.0 g of dimethylolpropionic acid, 239.2 g of polycarbonate diol (T-5652, manufactured by Asahi Chemical Chemicals, Corp.) having a number average molecular weight of 2000, and 294.8 g of acetone were mixed. Subsequently, 41.8 g of 1,3-(bisisocyanatomethyl)cyclohexane (manufactured by Mitsui Chemicals Polyurethanes, Inc.) and 0.07 g of stannous octoate were added thereto to allow the mixture to react at 55° C. for 10 hours, so that an isocyanate group-terminated prepolymer was obtained. Next, 5.7 g of triethylamine was added to this reaction solution to neutralize, and then the resulting solution was cooled to 30° C., and 700 g of ion exchange water was gradually added thereto to prepare an aqueous dispersion of the isocyanate group-terminated prepolymer. Then, 5.2 g of N-β(aminoethyl)-γ-aminopropylmethyl dimethoxysilane (KBM602, manufactured by Shin-Etsu Chemical Co., Ltd., Si atom content: 13.6% by weight) was added thereto to cause chain extension, and further, acetone was distilled off, to thereby obtain an aqueous polyurethane resin (h) having a solid content of 30% by weight. In the solid content of the aqueous polyurethane resin (h), the polyoxyethylene group content was 0% by weight and the Si atom content was 0.24% by weight.

Comparative Example 3

In a four-neck flask equipped with an agitator, a thermometer, a reflux tube, and a nitrogen introducing tube, 52.6 g of polyoxyethylene glycol (PEG#1540, manufactured by NOF Corporation) having a number average molecular weight of 1540, 213.3 g of polycarbonate diol (T-5652, manufactured by Asahi Chemical Chemicals, Corp.) having a number average molecular weight of 2000, 5.6 g of neopentyl glycol, and 226.8 g of acetone were mixed. Subsequently, 68.8 g of 4,4-dicyclohexylmethane diisocyanate (manufactured by Degussa Corporation) and 0.07 g of stannous octoate were added thereto, and the mixture was allowed to react at 55° C. for 10 hours, so that an isocyanate group-terminated prepolymer was obtained. The isocyanate group-terminated prepolymer thus obtained had a polyoxyethylene group content of 15.3% by weight. Next, the reaction solution was cooled to 30° C., and 700 g of ion exchange water was gradually added thereto to attempt to prepare an aqueous dispersion of the isocyanate group-terminated prepolymer. However, it resulted in poor dispersion, thereby failing to obtain an aqueous polyurethane resin.

Evaluation

The following evaluations were carried out for the aqueous polyurethane resin obtained by each of Examples and Comparative Examples. The results are shown in Table 1.

1) Preparation of Test Sample

The aqueous polyurethane resin obtained in each of Examples and Comparative Examples was cast into a film shape, and dried at 110° C. for 1 hour, to obtain a dry, transparent coating (test sample) having a thickness of 0.3 mm.

2) Odor Test

The test sample was checked for odor generated therefrom during the above-mentioned preparation (during heating at 110° C.). In Table 1, as the results of the sensory evaluation, "A" represents no amine-like odor, and "B" represents strong amine-like odor.

3) Moist Heat Resistance Test

The test sample prepared in step 1) was stored in a thermo-hygrostat of 70° C. and 95% RH for 1 week, and the 100% modulus (MPa), stress at break (tensile strength (MPa)), and elongation (%) of the test sample were measured before and after the storage.

4) Heat Resistance Test

The test sample prepared in step 1) was stored in a thermo-hygrostat of 110° C. for 400 hours, and the 100% modulus (MPa), stress at break (tensile strength (MPa)), and elongation (%) of the test sample were measured before and after the storage.

5) Alkali Resistance Test

The test sample prepared in step 1) was immersed in 1.5% by weight of an aqueous sodium hydroxide solution at 60° C. for 24 hours and the 100% modulus (MPa), stress at break (tensile strength (MPa)), and elongation (%) of the test sample were measured before and after the immersion.

6) Thermal Solidification Temperature

Twenty grams of the aqueous polyurethane resin obtained in each of Examples and Comparative Examples was added to a test tube having an inner diameter of 12 mm. After a thermometer was inserted therein, the test tube was sealed. The test tube was then immersed in a warm water bath of 95° C., and the temperature at the time when the aqueous polyurethane resin lost fluidity was measured as a thermal solidification temperature. The results are shown in Table 1.

TABLE 1

|  | Ex. 1 Aqueous Polyurethane Resin (c) | Ex. 2 Aqueous Polyurethane Resin (d) | Ex. 3 Aqueous Polyurethane Resin (e) | Ex. 4 Aqueous Polyurethane Resin (f) | Comp. Ex. 1 Aqueous Polyurethane Resin (g) | Comp. Ex. 2 Aqueous Polyurethane Resin (h) | Comp. Ex. 3 Failed to prepare an aqueous dispersion |
|---|---|---|---|---|---|---|---|
| Polyoxyethylene Group Content (wt %) | 6.8 | 7.7 | 7.8 | 7.5 | 7.8 | 0 | 15.3 |
| Si Atom Content (wt %) | 0.41 | 0.37 | 0.16 | 0.37 | 0 | 0.24 | — |
| Odor Test | A | A | A | A | A | B | — |

TABLE 1-continued

|  | Ex. 1 Aqueous Polyurethane Resin (c) | Ex. 2 Aqueous Polyurethane Resin (d) | Ex. 3 Aqueous Polyurethane Resin (e) | Ex. 4 Aqueous Polyurethane Resin (f) | Comp. Ex. 1 Aqueous Polyurethane Resin (g) | Comp. Ex. 2 Aqueous Polyurethane Resin (h) | Comp. Ex. 3 Failed to prepare an aqueous dispersion |
|---|---|---|---|---|---|---|---|
| Before Each of Tests 3) to 5) |  |  |  |  |  |  |  |
| 100% Modulus (Mpa) | 1.9 | 1.9 | 1.8 | 1.6 | 1.8 | 1.1 | — |
| Tensile Strength (Mpa) | 20.9 | 12 | 12.1 | 23.6 | 21.3 | 8.1 | — |
| Elongation (%) | 440 | 370 | 430 | 440 | 500 | 690 | — |
| After Moist Heat Resistance Test |  |  |  |  |  |  |  |
| 100% Modulus (Mpa) | 1.8 | 2.6 | 1.9 | 1.7 | 1.8 | 1.1 | — |
| Tensile Strength (Mpa) | 21.1 | 17.3 | 17.3 | 12.1 | 27.9 | 3.7 | — |
| Elongation (%) | 420 | 340 | 430 | 340 | 510 | 530 | — |
| After Heat Resistance Test |  |  |  |  |  |  |  |
| 100% Modulus (Mpa) | 1.4 | 2.4 | 1.9 | 1.3 | 0.5 | 0.9 | — |
| Tensile Strength (Mpa) | 8.1 | 11.7 | 11.3 | 15.2 | 2.6 | 4.8 | — |
| Elongation (%) | 340 | 280 | 390 | 400 | 600 | 720 | — |
| After Alkali Resistance Test |  |  |  |  |  |  |  |
| 100% Modulus (Mpa) | 1.5 | 2.7 | 2.5 | 1.7 | 2.5 | 1 | — |
| Tensile Strength (Mpa) | 27.1 | 10.9 | 10.9 | 23 | 19.2 | 3.4 | — |
| Elongation (%) | 440 | 330 | 390 | 430 | 450 | 900 | — |
| Thermal Solidification Temperature (° C.) | 68 | 72 | 75 | 70 | 75 | Not Solidified | — |

While the illustrative embodiments of the present invention are provided in the above description, such is for illustrative purpose only and it is not to be construed restrictively. Modification and variation of the present invention that will be obvious to those skilled in the art is to be covered by the following claims.

Industrial Applicability

The aqueous polyurethane resin of the present invention is suitably used for production of artificial leather, and can also be used in various applications such as vehicles, electronic equipment, building materials, coating materials, and adhesives.

The invention claimed is:

1. An aqueous polyurethane resin having a Si atom content of 0.05 to 1.5% by weight in a polyurethane resin obtained by reacting compounds consisting of
an isocyanate group-terminated prepolymer which comprises 1 to 15% by weight of a polyoxyethylene group in a side chain branched from the main chain and has two or more isocyanate groups at an end of the main chain, and
a chain extender which consists of a compound having two or more active hydrogen groups reactive with the isocyanate group and an alkoxysilyl group, wherein
the isocyanate group-terminated prepolymer is obtained by reacting compounds from the group consisting of: a polyisocyanate, one or more non-ionic low molecular weight polyol, a macropolyol, and a compound represented by the following general formula (1), wherein the one or more non-ionic low molecular weight polyol is selected from the group consisting of ethylene glycol, propanediol, 1,4-butylene glycol, 1,3-butylene glycol, 1,2-butylene glycol, 1,5-pentanediol, 3-methyl-1,5-pentanediol, 1,6-hexanediol, neopentyl glycol, alkane diol comprising 7 to 22 carbon atoms, diethylene glycol, triethylene glycol, dipropylene glycol, cyclohexane dimethanol, alkane-1,2-diol comprising 17 to 20 carbon atoms, hydrogenated bisphenol-A, 1,4-dihydroxy-2-butene, 2,6-dimethyl-1-octene-3,8-diol, bishydroxyethoxy benzene, xylene bishydroxyethylene terephthalate, glycerin, 2-methyl-2-hydroxymethyl-1,3-propanediol, 2,4-dihydroxy-3-hydroxymethylpentane, 1,2,6-hexanetriol, trimethylolpropane, 2,2-bis(hydroxymethyl)-3-butanol, aliphatic triol comprising 8 to 24 carbon atoms, tetramethylolmethane, D-sorbitol, xylitol, D-mannitol and D-mannite, and
the compound having two or more active hydrogen groups and an alkoxysilyl group contained in the chain extender is a compound represented by the following general formula (2), General formula (1):

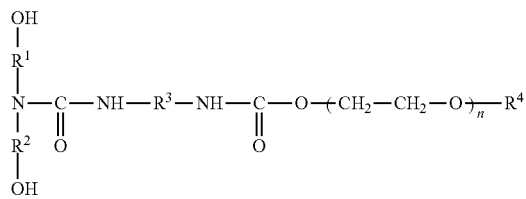

wherein $R^1$ and $R^2$ are the same or different from each other, and each represents an alkylene group of 1 to 4 carbon atoms; $R^3$ represents an aliphatic, alicyclic, or aralkyl hydrocarbon group of 6 to 13 carbon atoms; $R^4$ represents an alkyl group of 1 to 4 carbon atoms; and n represents an integer of 8 to 50, General formula (2):

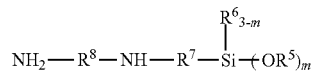

wherein $R^5$ and $R^6$ are the same or different from each other, and each represents an alkyl group of 1 to 4 carbon atoms; $R^7$ and $R^8$ are the same or different from each other, and each represents an alkylene group of 1 to 4 carbon atoms; and m represents an integer of 1 to 3.

2. The aqueous polyurethane resin according to claim 1, wherein the macropolyol is a polycarbonatediol.

3. The aqueous polyurethane resin according to claim 2, wherein the polycarbonatediol is an amorphous polycarbonatediol.

4. The aqueous polyurethane resin according to claim 1, wherein the polyisocyanate is an aliphatic polyisocyanate and/or an alicyclic polyisocyanate.

5. The aqueous polyurethane resin according to claim 4, wherein the polyisocyanate is at least one kind selected from the group consisting of 4,4'-, 2,4'- or 2,2'-dicyclohexylmethane diisocyanate or mixtures thereof, 1,3- or 1,4-bis(isocyanatomethyl)cyclohexane or mixtures thereof, 3-isocyanatomethyl-3,5,5-trimethylcyclohexyl isocyanate, and 2,5- or 2,6-bis(isocyanatomethyl)norbornane or mixtures thereof.

6. The aqueous polyurethane resin according to claim 1, having a thermal solidification temperature of 40 to 90° C.

7. The aqueous polyurethane resin according to claim 1, being used for production of artificial leather.

\* \* \* \* \*